United States Patent
Lashkarian (10) Patent No.: US 7,027,543 B1
(45) Date of Patent: Apr. 11, 2006

(54) MINIMUM VARIANCE UNBIASED AND MOMENT ESTIMATORS OF CARRIER FREQUENCY OFFSET IN MULTI-CARRIER SYSTEMS

(75) Inventor: Navid Lashkarian, Fremont, CA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/556,858

(22) Filed: Apr. 21, 2000

(51) Int. Cl.
*H04L 7/00* (2006.01)

(52) U.S. Cl. ..................................... 375/355; 375/326

(58) Field of Classification Search ................ 375/260, 375/326, 344, 219, 222, 355
See application file for complete search history.

(56) References Cited

U.S. PATENT DOCUMENTS 6,459,745 B1 * 10/2002 Moose et al. ............... 375/355

OTHER PUBLICATIONS

Pillai et al., "Improvements on the Cramer-Rao Bound", Apr. 1991, IEEE, International Conference on Acoustics, Speech, and Signal Processing, vol. 5, pp. 3565-3568.*

\* cited by examiner

*Primary Examiner*—Khai Tran
*Assistant Examiner*—David B. Lugo (57) ABSTRACT

A class of non data-aided cyclic based robust estimators for frequency offset estimation of multi-carrier systems is disclosed. The use of sufficient statistics provides a minimum variance unbiased (MVU) estimate of the frequency offset under complete knowledge of timing offset error. The Neyman-Fisher factorization theorem and Rao-Blackwell-Lehmann-Scheffe theorem are used to identify the sufficient statistic and appropriate mapping functions. It is shown that there is but one function of the sufficient statistics which results in the minimum variance estimate among the possible class of cyclic-based estimators. Also, a moment estimator of frequency offset is provided to obtain a consistent estimate of carrier offset under uncertain symbol timing error. The moment estimator does not rely on any probabilistic assumptions. Thus, its performance is insensitive to the distribution of the additive noise. A unified structure characterizing both the MVU and moment estimators, as well as a maximum likelihood estimator of a related, copending application is disclosed.

8 Claims, 3 Drawing Sheets

SIMULATION AND ANALYTICAL ESTIMATE OF FREQUENCY OFFSET (CLOSED LOOP)

MINIMUM VARIANCE UNBIASED AND MOMENT ESTIMATORS OF CARRIER FREQUENCY OFFSET IN MULTI-CARRIER SYSTEMS

CROSS-REFERENCE TO RELATED APPLICATION

This application is related to a application entitled "Globally Optimum Maximum Likelihood Estimation of Joint Carrier Frequency Offset and Symbol Timing Error," U.S. Ser. No. 09/496,890, filed on Mar. 2, 2000, now U.S. Pat. No. 6,678,339, assigned to the assignee of the instant invention, and the disclosure therein is hereby incorporated by reference into the instant application.

BACKGROUND OF THE INVENTION

1. Field of the Invention

The present invention relates to a method for data communication of signals in units of a frame using an orthogonal frequency division modulation (OFDM) algorithm, and in particular, to methods of estimating carrier frequency offset error at the receiver.

2. Description of the Prior Art

OFDM system is a viable modulation scheme for data transmission time varying dynamic channels. However, it is known that performance of such system is highly susceptible to non-ideal synchronization parameters. Specifically, symbol timing and carrier frequency offset become an increasingly important issue in implementation of OFDM systems for practical applications. It is known that carrier frequency offset deteriorates performance of OFDM systems by introducing interference among the sub-channels. To overcome this imperfection, various compensation methods for estimation and correction of synchronization parameters have been proposed. In order to compare the performance of these estimators, it is required to define a single number representing the goodness of the estimate. Assuming that all estimators are unbiased, i.e., expectation of the estimate is equal to the parameter, the variance of the estimator is used as a global measure for performance comparison of these estimators.

Cramer-Rao lower bound (CRLB) is a fundamental lower bound on the variance of the estimators and the unbiased estimator whose variance equals CRLB is called efficient. When the evaluation of efficient estimator is not possible, it is desirable to obtain an estimator in which its performance becomes as close as possible to the CRLB fundamental bound. The estimator which is closest in performance to the CRLB estimator is known as a minimum variance unbiased (MVU) estimator.

Categorically, the previously proposed methods for synchronization of OFDM systems can be classified into two main subclasses, namely minimum mean square error (MMSE) and maximum likelihood (ML) estimators. In MMSE approach, the estimator uses the information provided by the reference signal (pilot tones) in order to minimize a cost function associated with the synchronization parameters. A salient feature of this approach is that no probabilistic assumptions are made with regard to the data. Although MMSE estimators usually result in a tractable (globally stable) and easy to implement realization, no optimal criteria (probabilistic) is associated with these estimators. Also, since part of the transmitted information is allocated to the reference pilots, the bandwidth efficiency of these methods is lower in comparison to the non-pilot schemes.

On the other hand, ML estimators provide the estimate of the unknown parameter subject to minimum probability of error criteria. Although not exactly efficient, ML estimators are asymptotically MVU, i.e., their variance attains that of MVU estimator as the length of data record goes to infinity. However, due to the physical constraints, systems with infinitely long data records are not feasible for implementation purposes.

P. H. Moose, in "A Technique for Orthogonal Frequency Division Multiplexing Frequency Offset Correction," in IEEE Trans. On Communications, Vol. 42, No. 10, pp. 2908–2913, October 1994, describes the use of a retransmission technique in order to reveal the frequency offset parameter in the likelihood function of the received signal. Due to the redundancy introduced by repeating the data block, the data rate efficiency is decreased by a factor of two. To avoid this imperfection, a ML estimator based on cyclic prefix (CP) is described by J. van de Beck, M. Sandel and P. O. Borjesson, in "ML Estimation of Timing and Frequency Offset in OFDM Systems," IEEE Trans. On Signal Processing, Vol. 45, No. 3, pp. 1800–1805, July 1997. In this approach, the side information provided by the CP is used to obtain the likelihood function for joint estimation of symbol timing error and frequency offset in an OFDM system.

The likelihood function described in the Moose reference does not globally characterize the observation vector over the entire range of the timing offset. Consequently, the ML estimator proposed based on this likelihood function would result in considerable performance loss over a finite range of timing offset interval.

Currently, there is increasing interest in multi-carrier modulation (MCM) for dividing a communication channel into several subchannels and transmitting many subcarriers through a single band using frequency division multiplexing (FDM) techniques. In the MCM method, however, because several subcarriers occupying a narrow frequency domain are transmitted at one time, a relatively longer symbol period results compared with a single carrier modulation method. The MCM method has, owing to such characteristics, the advantages that equalization is easily performed and that it has immunity to impulse noise. OFDM is a type of the MCM designed to maximize the working frequency efficiency by securing orthogonality among the multiplexed subcarriers. OFDM is applied to mobile radio channels to attenuate multipath fading.

In an OFDM transmitting/receiving system, modulation and demodulation of parallel data are carried out using the Fast Fourier Transform (FFT). It is required that the sampled data be sent in predetermined frames, having passed through a FFT routine, been time-division multiplexed, and transmitted, then restored at the receiving end. However, if the synchronization is in error in the course of restoring the frame, the signals demodulated after the FFT will be influenced by interchannel and intersymbol interference. Accordingly, the problem of synchronization in reforming the frame, especially any joint carrier frequency offset or symbol timing error, must be addressed as a matter of importance.

Conventional synchronization methods as above-described encounter problems in that the process of synchronization is not only very complex, but the synchronization is not realized rapidly.

SUMMARY OF THE INVENTION

Motivated by the sub-optimum performance of estimators of the prior art, a likelihood function for joint estimation of carrier frequency offset and symbol timing error of OFDM systems is disclosed in the related, copending application; and a new optimum ML joint estimator is disclosed therein. In order to reduce the variance of that estimator, a new class of MVU estimators for frequency offset estimation of OFDM systems is disclosed herein.

There is disclosed to exist but one function of sufficient statistic which provides the MVU estimate of the frequency offset. The estimator provided by the instant invention is a closed form expression; providing an estimator which is a function of data statistic. Consequently, it does not suffer from converging to multiple local minima, a problem which arises in ML technique with nonconvex loglikelihood functions.

The advantages of the instant MVU estimator over the class of previously proposed estimators are two; first, it is MVU, therefore its variance is minimum among the entire class of estimators which use the same probabilistic measure. Secondly, it provides a closed form expression for mapping the statistics into the estimation domain. The former property assures optimality of the estimator, while the later facilitate the closed loop analysis of the system.

Accordingly, the present invention is directed at a synchronization method that substantially obviates on or more of the problems due to limitations and disadvantages of the prior art. To achieve these and other advantages, and in accordance with the purpose of the invention as embodied and broadly described, there is provided a method of estimating carrier frequency offset error in a received sample bit stream including an observation vector (OV), having an observed carrier frequency timing offset $\epsilon$, and a plurality of data-symbol frames, having a symbol timing offset error $\vartheta$. The method comprises the steps of generating a probability density function (PDF) based on the OV and generating from the PDF an estimate of carrier frequency offset error, $\epsilon_{MVU|\vartheta}$, being a minimum variance unbiased (MVU) estimator.

In another aspect of the invention, the OV comprises an L-bit cyclic extension portion and a first and a second N-bit synchronization frame, and wherein the PDF comprises a first term, p1, based on the timing offset $\vartheta$ being within the span 1 to N and a second term, p2, based on said timing offset $\vartheta$ being within the span N+1 to N+L. In yet another aspect of the invention the received bit stream has uncorrelated independent identically distributed random signal and noise sequence variables with power of $\sigma_s^2$ and $\sigma_n^2$, respectively, wherein the OV is denoted x, and wherein the MVU estimator $\epsilon_{MVU|\vartheta}$ is the conditional expectation of a second moment estimator, said second moment estimator given by $$\breve{\epsilon} = \frac{\Im}{2\pi} \ln\left\{\frac{1}{L\sigma_s^2} \sum_{k=\vartheta}^{\vartheta+L-1} x[k]x*[k+N]\right\}$$

In another aspect of the invention the MVU estimator $\epsilon_{MVU|\vartheta}$ is given by $$\breve{\epsilon}_{MVU|\vartheta} = E(\breve{\epsilon}|_{T_1(x,\vartheta)}) =$$

$$\frac{\Im}{2\pi} \ln E\left\{\frac{1}{L\sigma_s^2} \sum_{k=\vartheta}^{\vartheta+L-1} x[k]x*[k+N]\Big|_{T_1(x,\vartheta)}\right\} = \frac{1}{2\pi}\Im\left\{\ln\frac{T_1(x,\vartheta)}{L\sigma_s^2}\right\}$$

where $\Im$ is the imaginary operator and where $$T_1(x,\vartheta) = \begin{cases} \sum_{k=\vartheta}^{L+\vartheta-1} x[k]x*[k+N] \\ 1 \leq \vartheta \leq N \\ \sum_{k=\vartheta}^{\vartheta-N-1} x[k]x*[k+N] + \sum_{k=\vartheta}^{N+L-1} x[k]x*[k+N] \\ N+1 \leq \vartheta \leq N+L \end{cases}$$

The invention also provides a method of synchronizing a received sample bit stream, comprising the steps of transmitting at a transmitter the bit stream including an observation vector (OV), receiving and sampling at a receiver the bit stream, the sampled bit stream including, the OV with an observed carrier frequency offset $\epsilon$, and a plurality of data-symbol frames, having a symbol timing offset error $\vartheta$; generating a probability density function (PDF) based on the OV; generating from the PDF an estimate of carrier frequency offset error, $\epsilon_{MVU|\vartheta}$, being a minimum variance unbiased (MVU) estimator; and synchronizing the received bit stream by the MVU estimate of carrier frequency offset.

Further aspects of the synchronization method of the invention include wherein the OV comprises an L-bit cyclic extension portion and a first and a second N-bit synchronization frame, and wherein the PDF comprises a first term, p1, based on the observed timing offset $\vartheta$ being within the span 1 to N and a second term, p2, based on the observed timing offset $\vartheta$ being within the span N+1 to N+L. In yet another aspect of the inventuion, the synchronization method provides that the received bit stream has uncorrelated independent identically distributed random signal and noise sequence variables with power of $\sigma_s^2$ and $\sigma_n^2$, respectively, wherein the OV is denoted x, and wherein the MVU estimator $\epsilon_{MVU|\vartheta}$ is the conditional expectation of a second moment estimator, the second moment estimator given by $$\breve{\epsilon} = \frac{\Im}{2\pi} \ln\left\{\frac{1}{L\sigma_s^2} \sum_{k=\vartheta}^{\vartheta+L-1} x[k]x*[k+N]\right\}$$

Further aspect of the invention, the synchronization method wherein said MVU estimator $\epsilon_{MVU|\vartheta}$ is given by $$\breve{\epsilon}_{MVU|\vartheta} = E(\breve{\epsilon}|_{T_1(x,\vartheta)}) =$$

$$\frac{\Im}{2\pi} \ln E\left\{\frac{1}{L\sigma_s^2} \sum_{k=\vartheta}^{\vartheta+L-1} x[k]x*[k+N]\Big|_{T_1(x,\vartheta)}\right\} = \frac{1}{2\pi}\Im\left\{\ln\frac{T_1(x,\vartheta)}{L\sigma_s^2}\right\}$$

where $\Im$ is the imaginary operator and where $$T_1(x,\vartheta) = \begin{cases} \sum_{k=\vartheta}^{L+\vartheta-1} x[k]x*[k+N] \\ 1 \leq \vartheta \leq N \\ \sum_{k=0}^{\vartheta-N-1} x[k]x*[k+N] + \sum_{k=\vartheta}^{N+L-1} x[k]x*[k+N] \\ N+1 \leq \vartheta \leq N+L \end{cases}$$

In another aspect of the invention, A method of estimating carrier frequency offset error is provided for a received sample bit stream including an observation vector (OV), having an observed carrier frequency timing offset $\epsilon$, and a plurality of data-symbol frames, the OV comprising an L-bit cyclic extension portion and a first and a second N-bit synchronization frame, comprising the steps of generating the expected value of the autocorrelation of the kth entry of the OV; and generating from the expected value an estimate of carrier frequency offset error, $\epsilon_{mom}$, being a moment estimator.

In yet another aspect of the invention, the moment carrier frequency offset error estimation method further includes wherein the OV is denoted x, and wherein the moment estimator $\epsilon_{mom}$ is given by $$\hat{\epsilon}_{mom} = \frac{\Im}{2\pi}\{\ln T_3(x)\}$$

where the statistic $T_3(x)$ is defined as $$T_3(x) = \frac{1}{L\sigma_s^2} \sum_{k=0}^{N+L+1} x[k]x*[k+N].$$

A method of synchronizing a received sample bit stream, is also provided by the invention comprising the steps of: transmitting at a transmitter said bit stream including an observation vector (OV); receiving and sampling at a receiver said bit stream, said sampled bit stream including, said OV with an observed carrier frequency offset $\epsilon$, and a plurality of data-symbol frames, having a symbol timing offset error $\vartheta$; generating the expected value of the autocorrelation of the kth entry of the OV; generating from the expected value an estimate of carrier frequency offset error, $\epsilon_{mom}$, being a moment estimator; and synchronizing the received bit stream by the moment estimate of carrier frequency offset.

Further aspect of the invention provides a synchronization method wherein the OV is denoted x, and wherein the moment estimator $\epsilon_{mom}$ is given by $$\hat{\epsilon}_{mom} = \frac{\Im}{2\pi}\{\ln T_3(x)\}$$

where the statistic $T_3(x)$ is defined as $$T_3(x) = \frac{1}{L\sigma_s^2} \sum_{k=0}^{N+L+1} x[k]x*[k+N].$$

In yet another aspect of the invention, a method of estimating carrier frequency offset error in a received sample bit stream including an observation vector (OV), having an observed carrier frequency timing offset $\epsilon$, and a plurality of data-symbol frames, the OV comprising an L-bit cyclic extension portion and a first and a second N-bit synchronization frame, comprising the steps of: selecting one estimator method from a group of three: a maximum likelihood (ML) estimator, a minimum variance unbiased (MVU) estimator, a moment estimator, based on said OV; and generating from the selected estimator an estimate of carrier frequency offset error.

Additional features and advantages of the invention will be set forth in the description which follows, and in part will be apparent from the description, or may be learned by practice of the invention. The objectives and other advantages of the invention will be realized and attained by the methods particularly pointed out in the written description and claims hereof, as well as the appended drawings.

DETAILED DESCRIPTION OF THE INVENTION

The cross-referenced co-pending application entitled "Globally Optimum Maximum Likelihood Estimation of Joint Carrier Frequency Offset and Symbol Timing Error," U.S. Ser. No. 09/496,890, filed on Mar. 2, 2000, now U.S. Pat. No. 6,678,339, incorporated by reference discloses a probability density function (PDF),p, which globally characterizes an observation vector x according to the equation $$p(x, \epsilon, \vartheta) = p_1(x, \epsilon, \vartheta)(U[\vartheta-1] - U[\vartheta-N-1]) + p_2(x, \epsilon, \vartheta)(U[\vartheta-N-1] - U[\vartheta-N-L+1]) \quad (14)$$

where $\epsilon$ and $\vartheta$ are the frequency offset and symbol timing error introduced by the synchronization mismatch in the carrier frequency and symbol timing, respectively. And $p_1$ and $p_2$ are probability density functions derived and described in the related copending application.

Further derived and described therein are the statistics $T_1$ and $T_2$ $$T_1(x, \vartheta) = \begin{cases} \sum_{k=\vartheta}^{L+\vartheta-1} x[k]x*[k+N] \\ 1 \le \vartheta \le N \\ \sum_{k=\vartheta}^{\vartheta-N-1} x[k]x*[k+N] + \sum_{k=\vartheta}^{N+L-1} x[k]x*[k+N] \\ N+1 \le \vartheta \le N+L \end{cases} \quad (15)$$

and

-continued $$T_2(x, \vartheta) = \begin{cases} \sum_{k=\vartheta}^{L+\vartheta-1} |x[k]|^2 + |x[k+N]|^2 \\ 1 \leq \vartheta \leq N \\ \sum_{k=0}^{\vartheta-N-1} |x[k]|^2 + |x[k+N]|^2 + \sum_{k=\vartheta}^{N+L-1} |x[k]|^2 + |x[k+N]|^2 \\ N+1 \leq \vartheta \leq N+L \end{cases} \quad (16)$$

N and L being the number of samples per frame and the number of cyclically-extended samples appended at the beginning of each frame, respectively, all as further described in the related, copending application.

The MVU estimator of the instant invention is derived by resorting to the theory of sufficient statistics. The first step in deriving the MVU estimator is to obtain the sufficient statistic for the PDF given in (14). The sufficient statistic is known to be a function of the observation vector, namely T(x), such that the conditional PDF of the observation vector given T(x) does not depend on the unknown estimation parameters [ε,ϑ]. Evaluating the sufficient statistic is a formidable task for the broad class of PDFs, however the Neyman-Fisher Factorization theorem can be used for identifying the potential sufficient statistics. According to this theorem, if the PDF can be factored in the form g(T (x), ε, ϑ,)h(x) where g is a function depending on x only through T(x) and h(x) is a function depending only on x, then T(x) is a sufficient statistic for estimation of the parameters ε and ϑ. By reformulating the PDF given in 14 to $$p(x, \varepsilon, \vartheta) = e^{\frac{2\Re[e^{j2\pi\varepsilon}T_1(x,\vartheta)|\alpha|] - |\alpha|^2 T_2(x,\vartheta)}{2(1-|\alpha|^2)(\sigma_s^2 + \sigma_n^2)}} h_1(x)$$

there is a direct dependency between the parameter ϑ and the statistics $T_1(x,\vartheta)$ and $T_2(x,\vartheta)$. Based on this observation, the Neyman-Fisher theorem fails to provide a sufficient statistic for estimation of ϑ, we can factor the PDF into $$p(x, \varepsilon |\vartheta) = e^{\frac{\Re[e^{j2\pi\varepsilon}T_1(x,\vartheta)|\alpha|]}{(1-|\alpha|^2)(\sigma_s^2 + \sigma_n^2)}} h_2(x) \quad (17)$$

Clearly then, $T_1(x,\vartheta)$ forms a sufficient statistic for estimation of the parameter ε.

Next, application of the Rao-Blackwell-Lehmann-Scheffe (RBLS) theorem is used to find the MVU estimator. According to this theorem, if $\check{\varepsilon}$ is an unbiased estimator of ε and T(x) is a sufficient complete statistic for ε then $\hat{\varepsilon}=E(\check{\varepsilon}|_{T(x)})$ is a valid, unbiased, MVU estimator of ε.

In applying the above theorem, we need to obtain an unbiased estimator of ε, termed $\check{\varepsilon}$, and determine the conditional expectation of this estimator given the statistic $T_1(x,\vartheta)$. An appropriate candidate for the unbiased estimator of ε can be obtained from the statistical moments of the random vector x. The autocorrelation function of the observation vector x, E, yields that the second moment of the random variable x[k] with k∈Ω, satisfies the following identity $$E\{x[k]x^*[k+N]\} = \sigma_s^2 e^{-j2\pi\varepsilon} \quad (18)$$

Having this observation, one uses the second moment estimator as an unbiased estimator for ε as given by $$\check{\varepsilon} = \frac{\Im}{2\pi} \ln\left\{ \frac{1}{L\sigma_s^2} \sum_{k=\vartheta}^{\vartheta+L-1} x[k]x^*[k+N] \right\} \quad (19)$$

where $\Im$ is the imaginary operator. In deriving the above estimator, E(x[k]x*[k+N]) was replaced by its natural estimator $$\frac{1}{L} \sum_{k=\vartheta}^{\vartheta+L-1} x[k]x^*[k+N].$$

It is straightforward to verify that this estimator is unbiased as it satisfies the condition $$E\{\check{\varepsilon}\} = \frac{\Im}{2\pi} \ln E\left\{ \frac{1}{L\sigma_s^2} \sum_{k=\vartheta}^{\vartheta+L-1} x[k]x^*[k+N] \right\} = \varepsilon \quad (20)$$

Next, one obtains the conditional expectation of $\hat{\varepsilon}$ given the sufficient statistic $T_{1(x,\vartheta)}$ as follows $$\hat{\varepsilon}MVU|\vartheta = E(\check{\varepsilon}|_{T_{1(x,\vartheta)}}) = \quad (21)$$

$$\frac{\Im}{2\pi} \ln E\left\{ \frac{1}{L\sigma_s^2} \sum_{k=\vartheta}^{\vartheta+L-1} x[k]x^*[k+N]|_{T_1(x,\vartheta)} \right\} = \frac{1}{2\pi}\Im\left\{ \ln\frac{T_1(x,\vartheta)}{L\sigma_s^2} \right\}$$

It is important to emphasize that since the underlying PDF given in (14) belongs to the exponential family of PDFs, then the sufficient statistics $T_1(x,\vartheta)$ forms a complete statistic for estimation of the parameter ε. Therefore, the mapping function obtained from applying RBLS theorem, namely $\ln T(x,\vartheta)$, is but one function of the statistic $T_1(x,\vartheta)$ and no other estimator with the same statistic can result in a lower variance with respect to MVU estimator.

A. Cramer-Rao Lower Bound

It is known that under broad conditions, the variance of any unbiased estimator of a nonrandom parameter ε satisfies the CRLB as $$\text{var}(\hat{\varepsilon}MVU|\vartheta) \geq \frac{1}{I(\varepsilon)} \quad (22)$$

where I(ε) is the Fisher Information given by $$I(\varepsilon) = -E\left[ \frac{\partial^2 \ln pr(x,\varepsilon|_\vartheta)}{\partial \varepsilon^2} \right] \quad (23)$$

Substituting (17) into (23), after some algebraic manipulations, the CRLB of the MVU estimator becomes $$\text{var}(\hat{\varepsilon}_{MVU|\vartheta}) = \frac{(1-|a|^2)(\sigma_s^2+\sigma_n^2)}{(2\pi)^2|a|E\{T_1(x,\vartheta)\}} = \frac{\left(1+\frac{1}{SNR}\right)^2-1}{(2\pi)^2 L} \qquad (24)$$

where $$SNR \triangleq \frac{\sigma_S^2}{\sigma_N^2}$$

is the signal to noise ratio at the receiving end.

B. Closed Loop Performance

Figure 1:
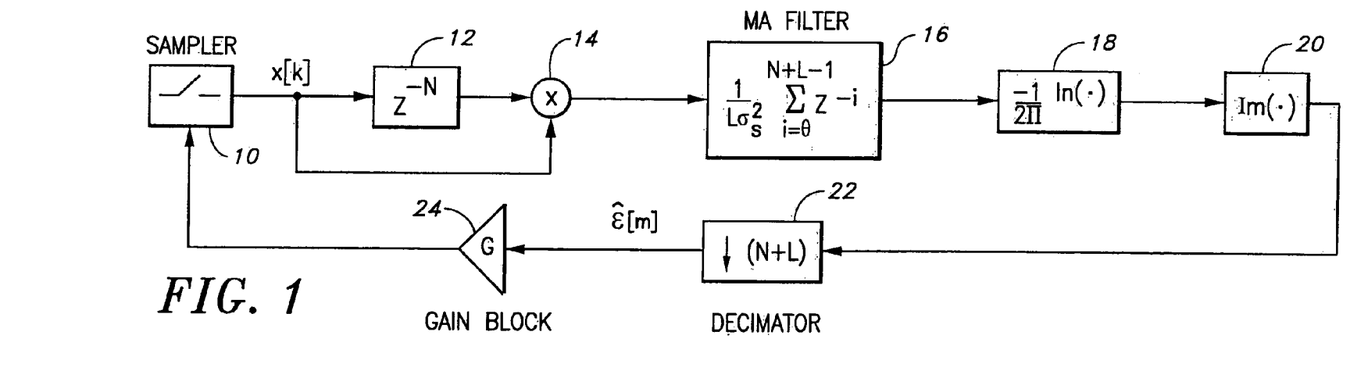
FIG. 1 is a signal flow block diagram depicting the frequency recovery loop for estimation of frequency offset.

FIG. 1 is a signal flow block diagram depicting the frequency recovery loop for estimation of frequency offset according to the instant invention. A closed loop system is obtained by feeding back the information obtained from the estimator into a sampler block (bootstrap). A sampler 10 updates its frequency at the beginning of each observation vector (every (N+L) samples). The sampler 10 receives the latest signal and produces the sampled symbol stream x[k] therefrom which is conducted to a block 12 and a block 14 performing the autocorrelation operation on the observation vector as required by equation (19). The result of the autocorrelation operation is conducted to a moving average (MA) filter block 16 and therefrom to a block 18 performing the natural logarithm function and thence to a block 20 performing the imaginary operation function, as required by equation (19). To match the various sampling frequencies used in the system, a down sampler (decimator) block 22 is used prior to return to the sampler 10 to produce the minimum variance unbiased estimator, $\check{\epsilon}[m]$. Finally, a gain block (G) 24 is used to control the closed loop characteristic of the system (stability, settling time, noise sensitivity).

According to FIG. 1, the frequency offset for the mth observation vector can be expressed as $$\hat{\varepsilon}[m] = \frac{1}{2\pi} \ln \frac{1}{L\sigma_s^2} \sum_{i=0}^{L-1} x_{(m-1)}[i] e^{-j\frac{2\pi\hat{\varepsilon}[m-1](\vartheta+i)}{N}} G x^*_{(m-2)}[i] e^{j\frac{2\pi\hat{\varepsilon}[m-2](\vartheta+i)}{N}} G \qquad (25)$$

$$= \frac{1}{2\pi} \ln \frac{1}{L\sigma_s^2} e_{j 2\pi\hat{\Delta\varepsilon}[m-1](\vartheta)} \sum_{i=0}^{L-1} x_{(m-1)}[i] x^*_{(m-2)}[i] e^{-j\frac{2\pi\Delta\hat{\varepsilon}[m-1](i)}{N}}$$

where $$\Delta\hat{\varepsilon}[m-1] \triangleq (\varepsilon[m-1]-\varepsilon)[m-2])G \text{ and}$$

$$x_m[i] \triangleq x[m(N+L)+\vartheta+i].$$

The term inside the sum is a stochastic quantity and does not have a closed form expression. However, for reasonably high signal to noise ratio it can be well approximated by its expected value $(E[x_{m-1}[i]x^*_{m-2}[i]]=\sigma_s^2)$. Therefore, the expression inside the sum can be written as $$\sum_{i=0}^{L-1} e^{-j\frac{2\pi\Delta\hat{\varepsilon}[m-1](i)}{N}} = \qquad (26)$$

$$\frac{1-e^{-j\frac{2\pi\Delta\hat{\varepsilon}[m-1](L)}{N}}}{1-e^{-j\frac{2\pi\Delta\hat{\varepsilon}[m-1]}{N}}} = e^{-j\frac{2\pi\Delta\hat{\varepsilon}[m-1](L-1)}{2N}} \frac{\sin\left(\frac{\Delta\hat{\varepsilon}[m-1]L}{2N}\right)}{\sin\left(\frac{\Delta\hat{\varepsilon}[m-1]}{2N}\right)}$$

$$\Delta\hat{\varepsilon}[m-1] \to 0 \; e^{-j\frac{2\pi\Delta\hat{\varepsilon}[m-1](L-1)}{2N}} L$$

Substituting (26) into (25), after some algebraic manipulations, the frequency offset of m'th observation vector becomes $$\hat{\varepsilon}[m] = -(\hat{\varepsilon}[m-1]-\hat{\varepsilon}[m-2])\frac{G}{N}\left(\vartheta+\frac{L-1}{2}\right) \qquad (27)$$

The above equation represents a second order finite difference system in which its dynamic can be obtained from solving the following equation $$\hat{\varepsilon}[m]+\beta\hat{\varepsilon}[m-1]-\beta\hat{\varepsilon}[m-2]=0$$

where $$\beta \triangleq \frac{G}{N}\left(\vartheta+\frac{L-1}{2}\right).$$

Clearly, the solution to the above finite difference equation is the form of $$\hat{\varepsilon}[m]=c_1(z_1)^m+c_2(z_2)^m \qquad (28)$$

where $$z_{1,2} \triangleq \frac{-\beta \pm \sqrt{\beta^2+4\beta}}{2}$$

are two dynamical modes of the system. The smaller root (negative) results in a high frequency oscillation in the frequency offset estimate. However, as is shown in a computer simulation, infra, this term is filtered out by the moving average filter. To assure stability, the gain block should be set such that both poles lie inside the unit circle.

$$|\beta_{max}+\sqrt{\beta^2 max+4\beta max}| \leq 2 \qquad (29)$$

where $$\beta_{max} \triangleq \max_{\vartheta} \frac{G}{N}\left(\vartheta+\frac{L-1}{2}\right) = \frac{G}{N}\left(N+L+\frac{L-1}{2}\right) \qquad (30)$$

It is known that when the timing offset parameter is not known to the receiver or if the noise PDF differs from Gaussian distribution, finding the optimum estimator (ML, MVU, CRLB) may not be an easy task. However there exists a moment estimator which provides a consistent estimate for estimation of frequency offset regardless of noise distribution and timing offset values. Although there is no optimum criterion associated with the moment estimator due to its simple structure, it is frequently used as an initial estimate for other estimators such as ML estimator. Consider a sequence of first N+L samples of vector x. Using the autocorrelation of kth entry of this vector satisfies the following identity Moment Estimator $$r_{xx}[N] = \begin{cases} \sigma_s^2 e^{-j2\pi\varepsilon} & k \in \Omega \\ 0 & k \in \Omega \end{cases} \quad (31)$$

Using Base Rule, the expected value of the above function (with respect to parameter k) can be expressed as $$E_k[r_{xx}[N]] = \qquad (32)$$
$$\sigma_s^2 \exp^{-j2\pi\varepsilon} pr(k \in \Omega) + 0 pr(k \in \Omega) = \frac{L}{L+N}\sigma_s^2 \exp^{-j2\pi\varepsilon}$$

Substituting the Nth autocorrelation lag with its natural estimator, the moment estimator for frequency offset under uncertain timing offset can be found as $$\hat{\varepsilon}_{mom} = \frac{\Im}{2\pi}\{\ln T_3(x)\} \qquad (33)$$

where the statistic $T_3(x)$ is defined as $$T_3(x) = \frac{1}{L\sigma_s^2} \sum_{k=0}^{N+L+1} x[k]x^*[k+N] \qquad (34)$$

Statistical assessment of moment estimator is a formidable task over entire range of SNR. However, for relatively high SNR, the random observation vector is heavily concentrated about its mean. Using the statistical linearization, and a first-order Taylor expression of the estimator about its mean to obtain the variance of estimate. In doing so, one substitutes for the random variable x in (34) and obtains $$T_3([x]) = f([s, w]) = \frac{\Im}{\ln}\left\{ L\sigma_s^2 \sum_{k=0}^{N+L+1} \left(s[k-\vartheta]\exp^{j\frac{2\pi k\varepsilon}{N}} + \right. \right. \qquad (35)$$
$$\left. \left. w[k]\right)\left(s^*[k-\vartheta+N]\exp^{-j\frac{2\pi(k+N)\varepsilon}{N}+w^*[k+N]}\right) \right\}$$

where the signal (s) and noise (w) vector are defined as $$s \triangleq [s[0]]\cdots s[N+L-1]] \qquad (36,37)$$
$$w \triangleq [w[0]]\cdots w[N+L-1]]$$

By virtue of the above equation, the expected value of observation vector for a fixed realization of signal vector s would be $E[\varepsilon_{mom}]=f(s)$. Then performing a first order Taylor expansion of f([s.w]) about the point $Ew_{[x]}$ yields $$\hat{\varepsilon}_{mom} = f([s, 0]) + \nabla \ wf([s, 0])^* w \qquad (38)$$
$$= f(s, 0]) + \sum_{n=0}^{L+N-1} \frac{\partial f([s, w])}{\partial w[n]} \bigg| (w = 0)^{w[n]}$$

Taking the derivative of (35) with respect to w[n] and setting w=0, results in $$\frac{\partial h}{\partial w[n]} \bigg| w =$$
$$0 = \frac{1}{2\pi}\left(\sum_{i=0}^{N+L-1} s[i-\vartheta]s^*[i-\vartheta+N]e^{-j2\pi\varepsilon}\right)^{-1} s^*[n+N-\vartheta]e^{\frac{2\pi\varepsilon(n+N)}{N}}$$

The second term in (38) represents the contribution of noise in the estimate. Knowing that noise samples are iid with power of $\sigma_w^2$, the variance of estimate can be obtained from $$\mathrm{var}(\varepsilon) \cong \frac{\sum_{n=0}^{L+N-1}|s[n+N-\vartheta]|^2\sigma_w^2}{\left(2\pi\sum_{i=0}^{N+L-1}s[i-\vartheta]s^*[i-\vartheta+N]\right)^2} \qquad (39)$$

For sufficiently large block lengths (N), the above term can be well approximated as $$\mathrm{var}(\varepsilon) \cong \frac{(N+L)\sigma_s^2\sigma_w^2}{(2\pi L\sigma_s^2)^2} = \frac{(N+L)}{(2\pi L)^2 SNR} \qquad (40)$$

The resemblance between the estimators of equations (21) and (33) reveals a unified structure which characterizes the ML, MVU and moment estimators which can be classified into a single unified structure. This provides a unique framework for analysis of the proposed estimators. Moreover, it allows an investigation of the effect of symbol timing error in the estimation of carrier offset for each individual estimator. Comparing the MVU estimator given in (21) to the moment estimator in (33) reveals some similarities in the structure of the estimators. Clearly, both moment and MVU estimators use the same mapping function, namely the log function, to project the data statistics into the estimation domain. The only difference is in the form of statistics used for each scheme.

Figure 2:
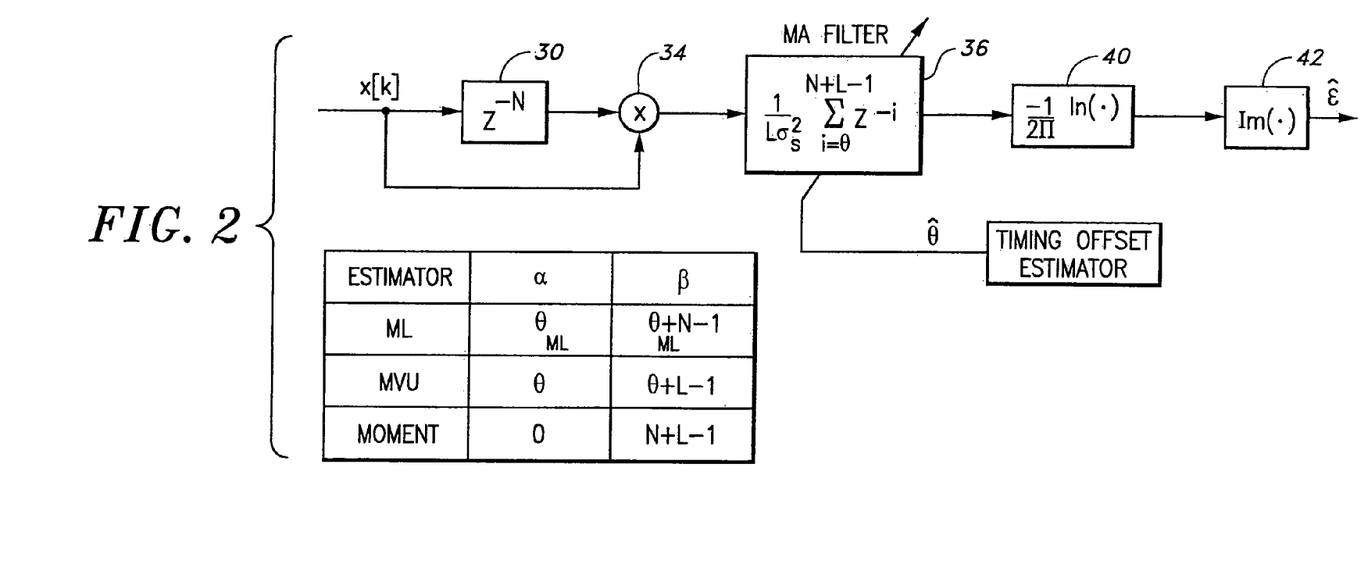
FIG. 2 is a block diagram depiction of the ML estimator disclosed in the cross-referenced, copending application and the MVU and moment estimators of the instant invention.

FIG. 2 is a block diagram depiction of the ML estimator disclosed in the cross-referenced, copending application and the MVU and moment estimators of the instant invention. An autocorrelation operation on the observation vector x[k] is performed by blocks 30 and 34; as shown in FIG. 2, both estimators of the instant invention obtain the statistic by correlating the samples with the Nth delayed samples. This operation is performed by using a moving average (MA) filter (shown as a block 36) in the structure of estimators. However, the MVU and moment estimators use different upper and lower bound for the MA filter. In the moment estimator, the averaging is performed over the first N+L samples of the observation vector. This would remove the requirement of knowing the exact timing offset parameter in estimation of carrier frequency offset. However, the estimate obtained from using this estimator results in a less accurate estimate (more variance) in comparison to MVU estimate. On the other hand, the MVU estimator requires the knowledge of symbol timing in the estimation of carrier frequency offset, as shown in FIG. 2 by a block 38 conducting $\vartheta$ to the MA block 36. Finally, as in FIG. 1, a block 40 and a block 42 perform the natural logarithm and imaginary, respectively, operations on the symbol stream before generating the estimate of carrier frequency offset $\epsilon$.

Although the resemblance between MVU and ML estimators may not be as evident as that of MVU and moment estimator, it can be shown that ML estimator can also be classified into the same family. Knowing the fact that $\Im\{\log T_{1(x,\vartheta)}\} = \angle T_1(x,\vartheta)$ the ML estimator can be expressed as $$\varepsilon_{ML} = \frac{-1}{2\pi} \Im \left\{ \sum_{k=\alpha}^{\beta} x^*[k]x[k+N] \right\} \quad (41)$$

where the parameters $\alpha$ and $\beta$ are functions of $\vartheta_{ML}$ and can be obtained from the expression for $T_1(x,\vartheta)$, supra. Thus, the ML estimator falls into the same family of estimators. FIG. 2 also displays in tabular form these estimators, their respective summation upper and lower bounds, and their respective averaging intervals. It is noticed that the ML estimator provides the upper and lower bound of the moving average filter (36) by extracting the timing parameter from the likelihood function. Although the ML estimator has the advantage of exploiting the entire bandwidth by removing the requirement for having pilot tones, the symbol timing estimate obtained from the ML estimator has a larger confidence interval. This may result in a considerable performance degradation in comparison to the pilot-based schemes.

Computer simulation is used to assess the performance of the three estimators for synchronization of an OFDM system. The variance of estimator is used as a performance measure through the study. The simulation parameters used are typical of the OFDM and digital audio broadcast (DAB) environments. More specifically, the chosen FFT size (N) for OFDM is 64. Unless otherwise specified, the length of cyclic prefix (L), signal to noise ratio, and frequency offset are set to 8, 20 dB and 0.01, respectively. Monte Carlo simulation is used to evaluate the performance of the three estimators.

Figure 3:
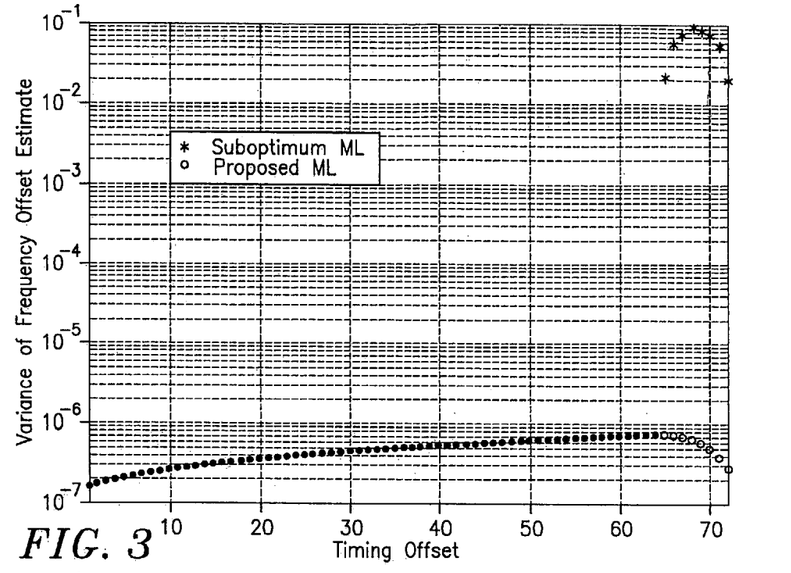
FIG. 3 is a graph comparing the computer simulations of the prior art ML frequency offset estimation and the ML frequency offset estimation disclosed in the related, copending application.

FIG. 3 graphically depicts a comparison between the performance of the ML frequency offset estimator disclosed in the related, copending application with the prior art ML frequency offset estimator given in the van de Beek, et al, reference over the range of timing offset parameter ($\vartheta \in [1, N+L]$).

Figure 4:
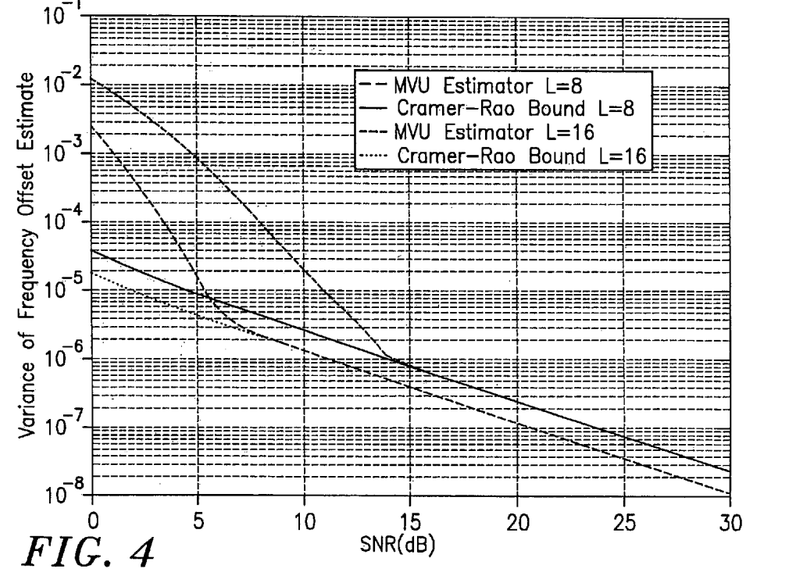
FIG. 4 is a graph comparing the computer simulations of the MVU frequency offset estimator of the instant invention with that of the CRLB estimator.

FIG. 4 graphically depicts the performance of the MVU frequency offset estimator of the instant invention under complete knowledge of timing offset error. A careful examination of the variances reveals that the gap between MVU estimator and CRLB tends to zero as SNR increases. Also as illustrated in FIG. 4, the departure from CRLB happens rapidly as SNR goes below a threshold. The threshold also depends on the length of CP and is moved toward lower SNRs as L increases. This can be justified in terms of having more observation samples in estimating the unknown parameter. The choice of cyclic prefix length L represents a tradeoff between data rate reduction and performance (lower variance). Increasing L brings the performance of MVU estimator closer to the CRLB, nevertheless, it could result in a considerable data rate reduction due to the redundancy introduced by CP.

Figure 5:
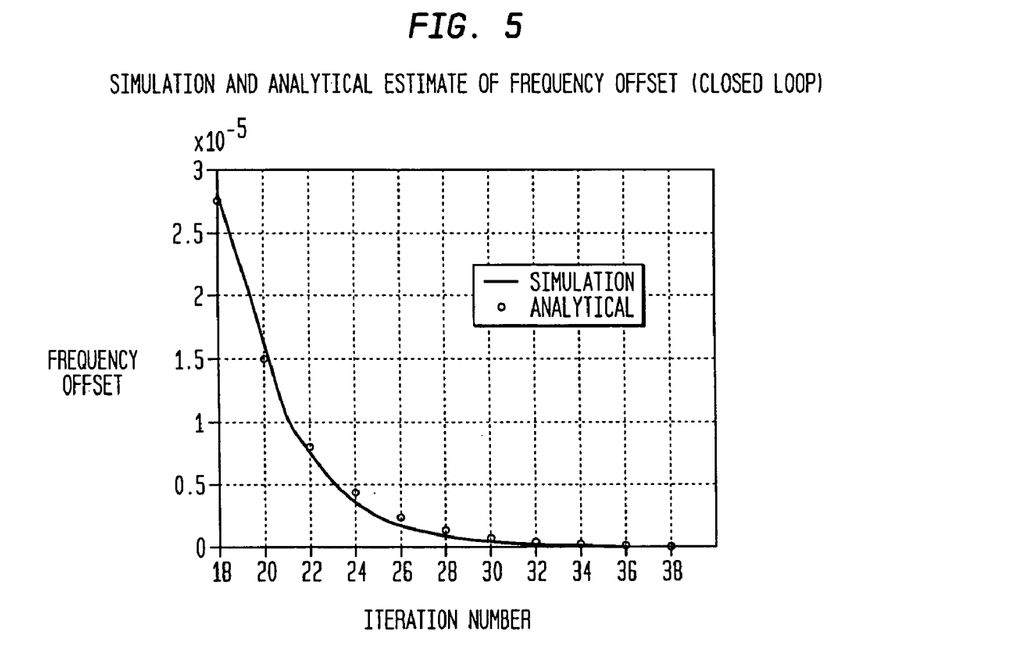
FIG. 5 graphically depicts the closed loop performance of the MVU estimator of the instant invention by comparing the frequency offset estimate of the closed loop MVU estimator against an analytical derivation thereof.

FIG. 5 graphically depicts the closed loop performance of the MVU estimator of the instant invention by comparing the frequency offset estimate of the closed loop MVU estimator and the analytical derivation given in equation (28). It is clear that the simulation result very closely resembles the analytical model, thus consolidates the approximate model of the closed loop system.

Numerous variations and modifications will become evident to those skilled in the art once the disclosure is fully appreciated. It is intended that the following claims be interpreted to embrace all such variations and modifications.

What is claimed is:

1. A method of estimating carrier frequency offset error in a received sample bit stream including an observation vector (OV), having an observed carrier frequency timing offset $\epsilon$, and a plurality of data-symbol frames, having a symbol timing error $\vartheta$, comprising the steps of:
   generating a probability density function (PDF) based on an extension portion and a synchronization portion of said OV, the PDF including first and second terms based on said symbol timing error $\vartheta$; and
   generating from said PDF an estimate of carrier frequency offset error, $\epsilon_{MVU|\vartheta}$, being a minimum variance unbiased (MVU) estimator.

2. The method of claim 1 wherein said extension portion comprises an L-bit cyclic extension portion and said synchronization portion comprises first and second N-bit synchronization frames, and wherein the first term, p1, based on said symbol timing error $\vartheta$ being within the span 1 to N and the second term, p2, based on said symbol timing error $\vartheta$ being within the span N+1 to N+L.

3. The method of claim 2 wherein said bit stream has uncorrelated independent identically distributed random signal and noise sequence variables with power of $\sigma_s^2$ and $\sigma_n^2$, respectively, wherein said OV is denoted x, and wherein said MVU estimator $\epsilon_{MVU|\vartheta}$ is the conditional expectation of a second moment estimator, said second moment estimator given by $$\breve{\varepsilon} = \frac{\Im}{2\pi} \ln \left\{ \frac{1}{L\sigma_s^2} \sum_{k=\vartheta}^{\vartheta+L-1} x[k]x^*[k+N] \right\}.$$

4. The method of claim 3 wherein said MVU estimator $\epsilon_{MVU|\vartheta}$ is given by $$\breve{\varepsilon}_{MVU|\vartheta} = E(\breve{\varepsilon} \mid T_{1(\chi,\vartheta)})$$
$$= \frac{\Im}{2\pi} \ln E \left\{ \frac{1}{L\sigma_s^2} \sum_{k=\vartheta}^{\vartheta+L-1} x[k]x^*[k+N] T_{1(\chi,\vartheta)} \right\}$$
$$= \frac{1}{2\pi} \Im \left\{ \ln \frac{T_1(\chi,\vartheta)}{L\sigma_s^2} \right\}$$

where $\Im$ is an imaginary operator and where $$T_{1(\chi,\vartheta)} = \begin{cases} \sum_{k=\vartheta}^{L+\vartheta-1} x[k]x^*[k+N] & 1 \le \vartheta \le N \\ \sum_{k=0}^{\vartheta-N-1} x[k]x^*[k+N] + \sum_{k=\vartheta}^{N+L-1} x[k]x^*[k+N] & N+1 \le \vartheta \le N+L. \end{cases}$$

5. A method of synchronizing a bit stream, comprising the steps of:
sampling, at a receiver, said bit stream, said sampled bit stream including i) an observation vector (OV) having an observed carrier frequency offset $\epsilon$, and ii) a plurality of data-symbol frames having a symbol timing error $\vartheta$;
generating a probability density function (PDF) based on an extension portion and a synchronization portion of said OV, the PDF including first and second terms based on said symbol timing error $\vartheta$;
generating from said PDF an estimate of carrier frequency offset error, $\epsilon_{MVU|\vartheta}$, being a minimum variance unbiased (MVU) estimator; and
synchronizing said bit stream by said MVU estimate of carrier frequency offset.

6. The method of claim 5 wherein said extension portion comprises an L-bit cyclic extension portion and said synchronization portion comprises first and second N-bit synchronization frames, and wherein said first term, p1, based on said observed symbol timing error $\vartheta$ being within the span 1 to N and said second term, p2, based on said observed symbol timing error $\vartheta$ being within the span N+1 to N+L.

7. The method of claim 6 wherein said bit stream has uncorrelated independent identically distributed random signal and noise sequence variables with power of $\sigma_s^2$ and $\sigma_n^2$, respectively, wherein said OV is denoted x, and wherein said MVU estimator $\epsilon_{MVU|\vartheta}$ is the conditional expectation of a second moment estimator, said second moment estimator given by $$\breve{\varepsilon} = \frac{\Im}{2\pi} \ln\left\{\frac{1}{L\sigma_s^2} \sum_{k=\upsilon}^{\vartheta+L-1} x[k]x^*[k+N]\right\}.$$

8. The method of claim 7 wherein said MVU estimator $\epsilon_{MVU|\vartheta}$ is given by $$\begin{aligned}\breve{\varepsilon}_{MVU|\vartheta} &= E(\breve{\varepsilon} \mid T_{1(\chi,\vartheta)}) \\ &= \frac{\Im}{2\pi} \ln E\left\{\frac{1}{L\sigma_s^2} \sum_{k=\vartheta}^{\vartheta+L-1} x[k]x^*[k+N] T_{1(\chi,\vartheta)}\right\} \\ &= \frac{1}{2\pi}\Im\left\{\ln\frac{T_1(\chi,\vartheta)}{L\sigma_s^2}\right\}\end{aligned}$$

where $\Im$ is an imaginary operator and where $$T_{1(\chi,\vartheta)} = \begin{cases} \sum_{k=\vartheta}^{L+\vartheta-1} x[k]x^*[k+N] & 1 \le \vartheta \le N \\ \sum_{k=0}^{\vartheta-N-1} x[k]x^*[k+N] + \sum_{k=\vartheta}^{N+L-1} x[k]x^*[k+N] & N+1 \le \vartheta \le N+L. \end{cases}$$

* * * * *